Feb. 20, 1923.

W. DUSTER.
APPARATUS FOR HANDLING PLATES OF GLASS OR THE LIKE.
FILED DEC. 9, 1921.

INVENTOR
William Duster
by Byrnes Stebbins Burgess & Parmelee
his Attorneys

Feb. 20, 1923.  
W. DUSTER,  
APPARATUS FOR HANDLING PLATES OF GLASS OR THE LIKE,  
FILED DEC. 9, 1921.  
1,446,003.  
6 SHEETS—SHEET 5.
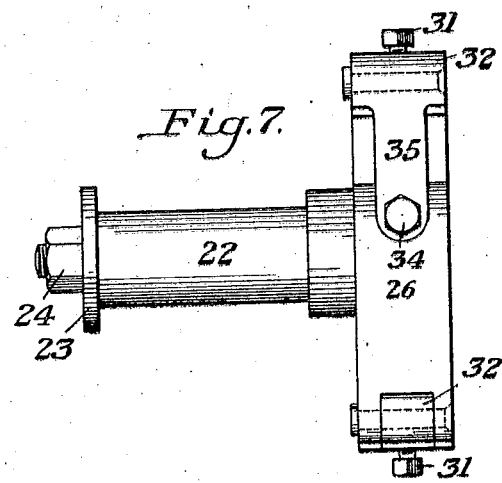
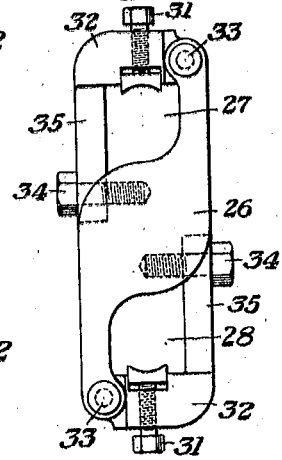
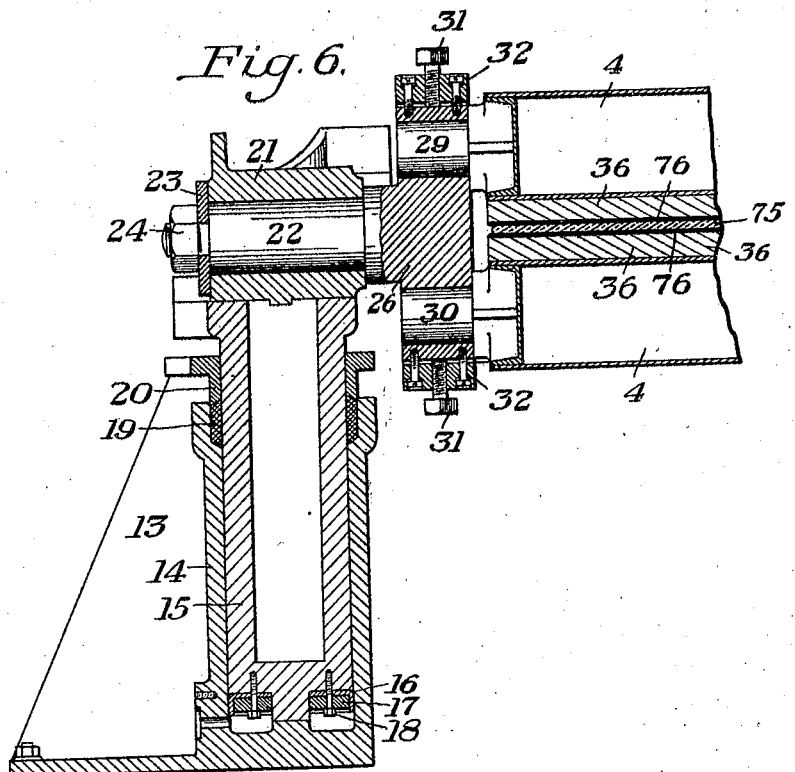
INVENTOR  
William Duster  
by Byrnes Stebbins Burgess & Parmelee  
his attorneys Feb. 20, 1923.  
W. DUSTER.  
APPARATUS FOR HANDLING PLATES OF GLASS OR THE LIKE.  
FILED DEC. 9, 1921.

INVENTOR  
William Duster  
by Byrnes Stebbins Burgess + Parmelee  
his Attorneys Patented Feb. 20, 1923.  1,446,003

UNITED STATES PATENT OFFICE.

WILLIAM DUSTER, OF BUTLER, PENNSYLVANIA.

APPARATUS FOR HANDLING PLATES OF GLASS OR THE LIKE.

Application filed December 9, 1921. Serial No. 521,242.

*To all whom it may concern:*

Be it known that I, WILLIAM DUSTER, a citizen of the United States, residing at Butler, in the county of Butler and State of Pennsylvania, have invented a new and useful Improvement in Apparatus for Handling Plates of Glass or the like, of which the following is a full, clear, and exact description.

My invention relates to apparatus for handling plates of glass or the like, and is particularly directed to apparatus for turning plates of glass in the process of grinding and polishing such plates on both sides.

Heretofore in the handling of plates of glass they were ground and polished on one side after the plate had been set in some suitable plaster, such as plaster of Paris. Upon the completion of the grinding and polishing of one side, the plate was removed from the plaster by prying it loose, usually by the hands. It was then turned and placed again on a polishing table in plaster with the polished side downward, whereupon the plate was ground and polished on the other side and then removed from the table and placed in suitable storage. The removal of the plate from the polishing table and the turning of it, resulted in frequent breakage of the glass due to the transverse stresses set up in the glass during those operations. The breakage resulted in much loss of material, and the turning involved considerable expense due to the amount of labor and the time consumed in the operation.

In some instances it is necessary to grind the plates on one side and then on the other, and to separately polish the plates on one side and then on the other. In cases of that kind, it is necessary to turn the plates twice, with the resultant loss in material, time and labor.

By the use of my invention, the loss of material due to breakage is entirely eliminated and the time and labor consumed in the turning operation are materially decreased. The breakage is avoided because the plates are supported throughout the major portion of their area on both sides, during the turning operation, as a result of which the plates are not subjected to any transverse strains and are therefore never broken. Furthermore, by the use of my invention the plates may be handled with less care, and therefore more rapidly, by reason of the protection which is afforded them during the turning operation.

My invention will be better understood by reading the following description taken in connection with the accompanying drawings forming a part thereof and in which—

Figure 6 is a section on the line VI—VI of Figure 5;

Figure 7 shows one of the turning trunnions and the means for clamping the tables thereto;

Figure 8 shows a side elevation of the clamping means;

Figure 1:
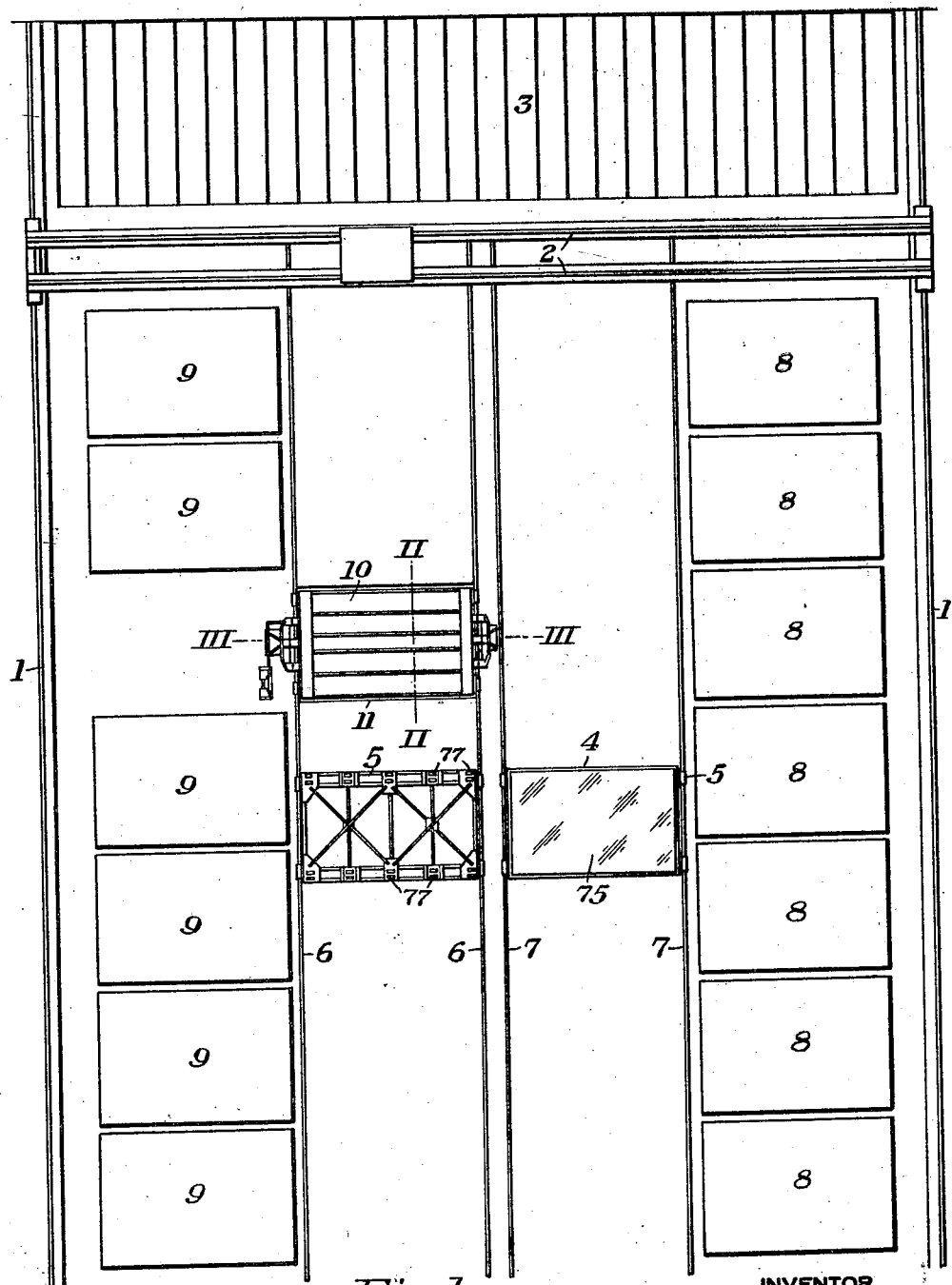
Figure 1 shows a diagram of the location of the essential parts of a shop for handling plates of glass.
Figure 2:
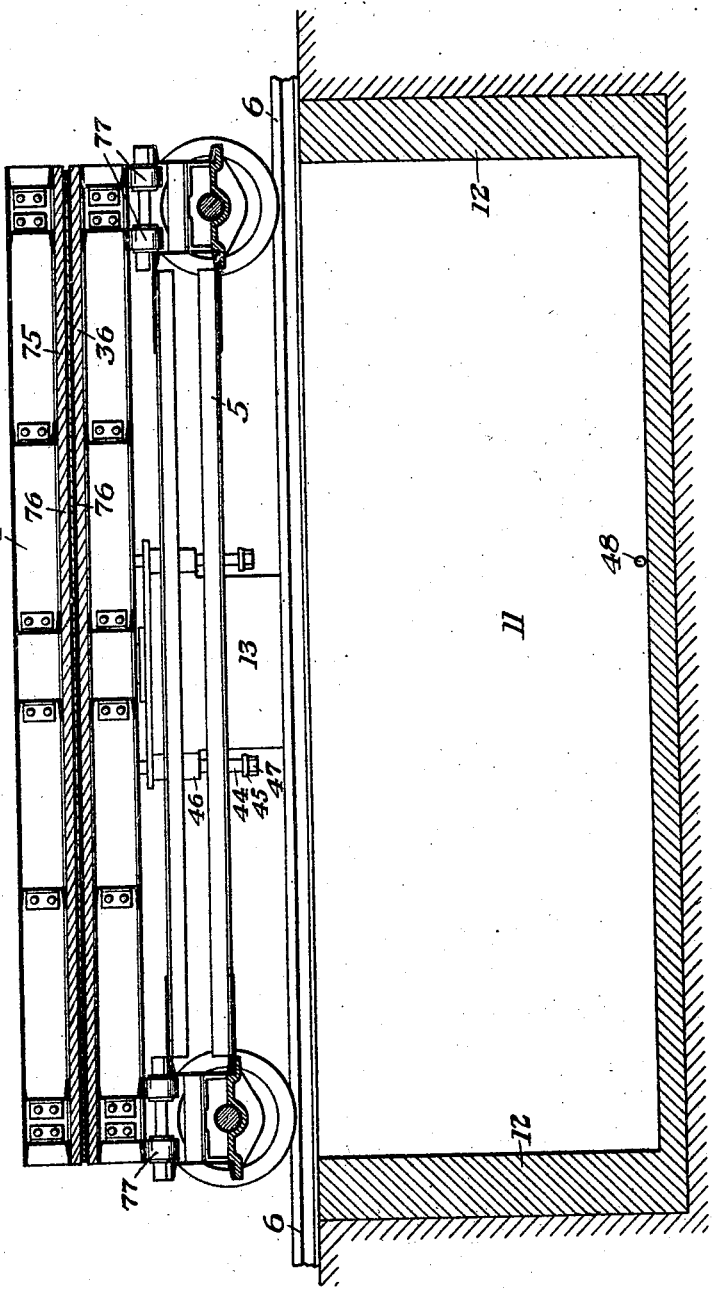
Figure 2 is a section on an enlarged scale on the line II—II of Figure 1.
Figure 3:
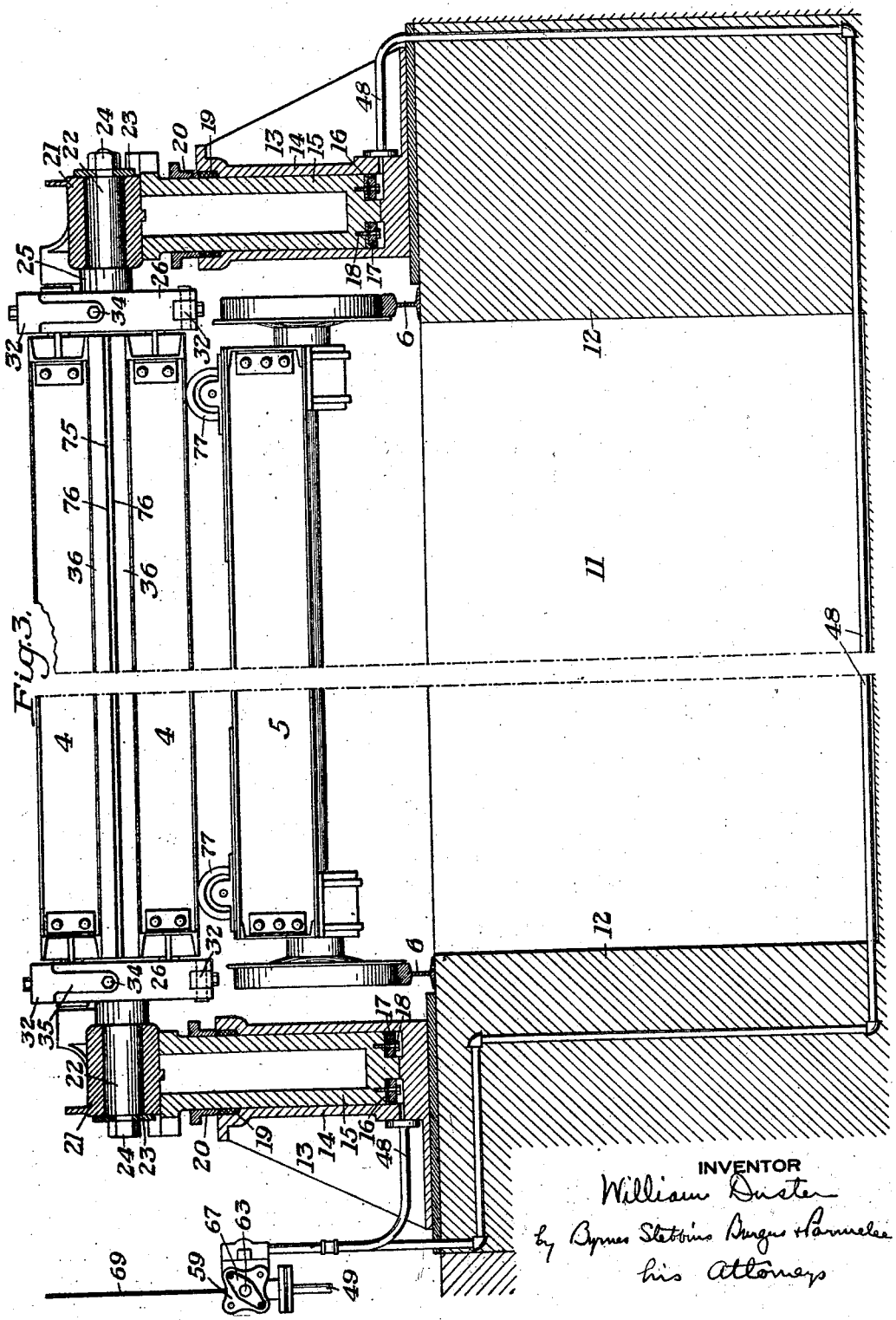
Figure 3 is a section on an enlarged scale on the line III—III of Figure 1.

Referring to the drawings, particularly Figure 1, tracks 1 are provided for an overhead crane 2 which is ordinarily used to take plates of glass from the rack 3 and place them at suitable points for loading on the grinding and polishing tables 4, which are shown in detail in Figures 2 and 3. The tables 4 are adapted to be mounted upon trucks 5 which operate upon the tracks 6 and 7. The tracks 7 extend in front of a plurality of grinding machines 8, and the tracks 6 extend in front of a plurality of polishing machines 9. Arranged along the tracks 6, is a device 10, shown in detail in Figures 3 to 10, for turning the plates, as will appear more fully hereinafter. My invention is not limited to the exact arrangement of the grinders and polishers and other parts as shown in Figure 1.

At a suitable point along the tracks 6 is a pit 11 of the required size and depth. This pit has a lining 12 of concrete or other suitable material. Placed on each side of the pit 11 is a hydraulic jack 13, as shown in Figure 3. These jacks comprise a base or cylinder member 14 into which fits a piston member 15 having a packing 16 on the bottom end thereof, which packing is held in place by members 17 and bolts 18. The upper ends of the members 14 are provided with an offset portion filled with packing material 19. Packing glands 20 are suitably secured around the members 14 so as to compress the packing material, in the usual manner. The piston members 15 of the jacks are provided with suitable bearings 21 in which are placed trunnions 22. A collar 23 is placed around a reduced portion of the trunnion 22 and is held in place by a nut 24. The trunnion 22 is provided with an enlarged portion 25 which abuts against one end of the bearing 21, whereas the collar 23 abuts against the opposite end of the bearing.

Each of the trunnions 22 is also provided with a clamping member 26, as shown in detail in Figures 6 and 7. Each of these clamping members is provided with openings 27 and 28 for receiving projections 29 and 30 on the tables 4, as shown in Figure 6. The members 26 are provided with bearing shoes carried by adjusting screws 31 for the purpose of holding the tables 4 together through the members 29 and 30. The screws 31 are fastened in members 32 which are pivoted at 33 to the member 26 and are held against rotation around the pivots 33 by bolts 34 which pass through an extension 35 thereon and are screwed into the body portion of the member 26.

The body portions of the tables 4 are constructed of steel channels and angles, or other suitable material, and placed upon the body portions are platforms 36, preferably of wood. Each of the tables is provided at its ends with the projections 29 or 30 through which the tables are held together during the turning operation. The projections 29 and 30 are placed at the center lines of the tables and at certain times act as trunnions for the tables.

Figure 4:
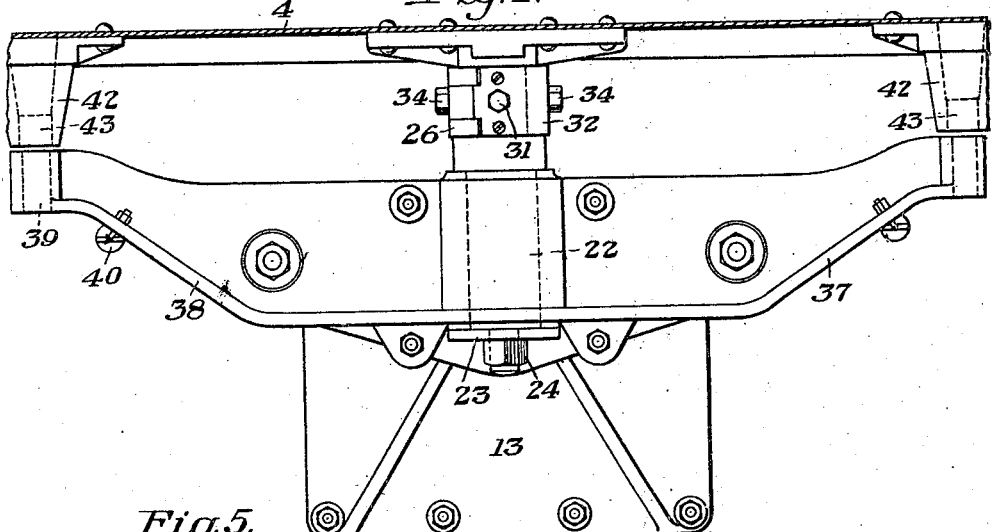
Figure 4 is a plan view of one side of the turning means, showing a part of a table in section.
Figure 5:
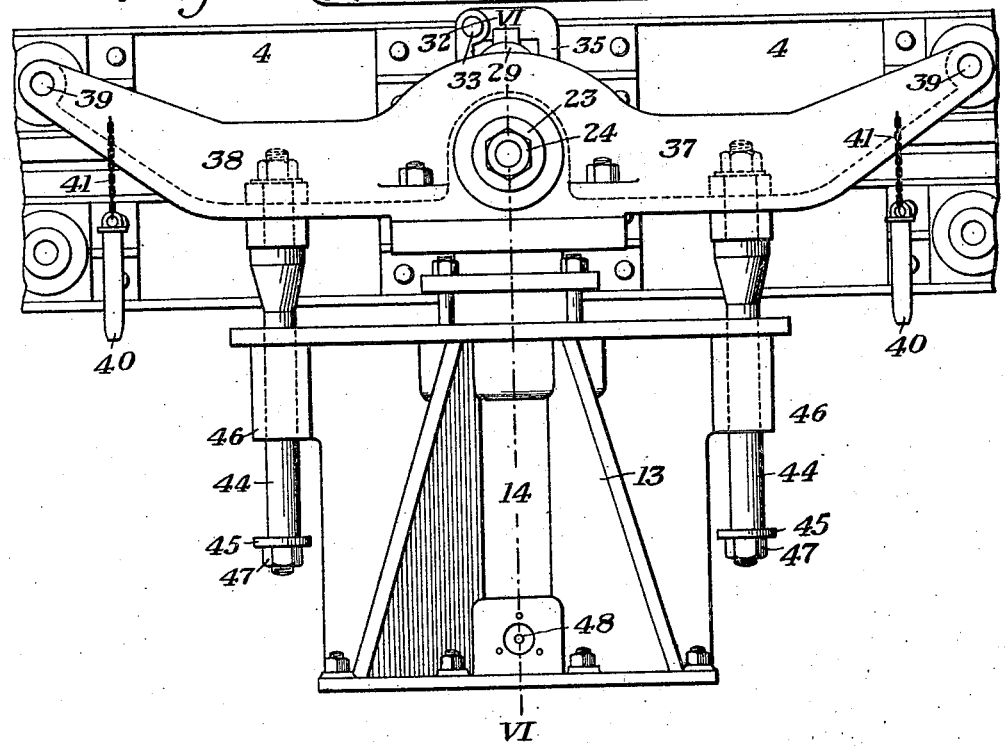
Figure 5 shows an elevation of one end of the turning means with two tables thereon.
Figure 9:
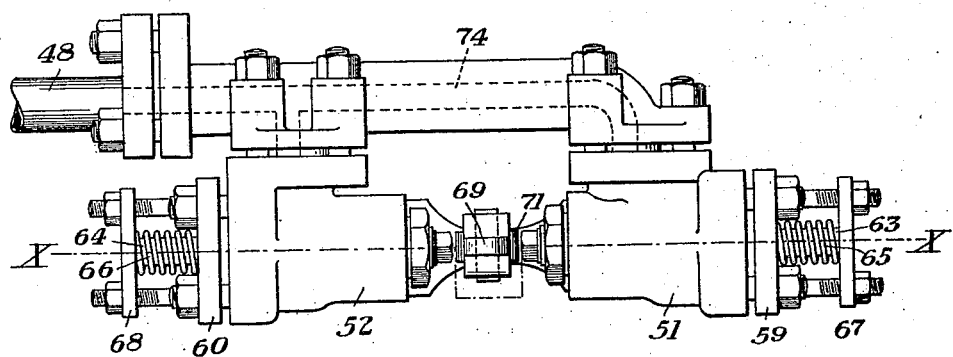
Figure 9 is a plan view of the valves and control means.

The piston members 15 of the jacks carry arms 37 and 38, as shown in Figures 4 and 5. These arms are provided at their ends with openings 39, and are adapted to receive pins 40, one of which is attached to each of said arms near the end thereof by a chain 41 or other suitable means. The tables 4 are provided with bosses 42 which have openings 43 therein, which register with the openings 39 in the arms 37 and 38 when the tables are in a horizontal position. The pins 40, when placed in the openings 39 and 43, lock the table in the position shown in Figures 4 and 5. Depending from the arms 37 and 38 are guides 44 which pass through openings in the base members 14 of the jacks. The members 44 act to guide the arms 37 and 38 in their vertical movements, and act also to limit the upward movement of the pistons 15 in the cylinders of the jacks. This limiting of movement is effected by the collars 45 coming into contact with the shoulders 46 on the members 14. The collars 45 are held in place by nuts 47 which are screwed onto the threaded ends of the members 44.

Figure 10:
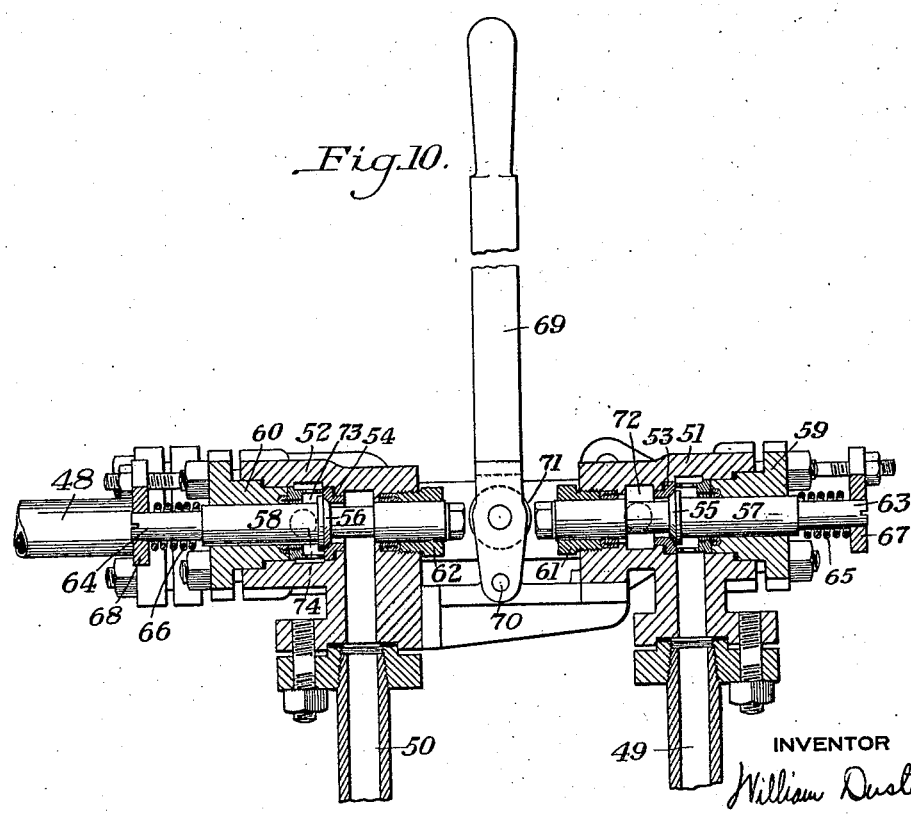
Figure 10 is a section on the line X—X of Figure 9.

Leading into the bottom of each of the cylinders of the jacks is a pipe 48 which is connected through the valve mechanism shown in section in Figure 10, with an inlet pipe 49 and exhaust pipe 50. The valve mechanism shown in Figure 10 comprises castings 51 and 52 which are provided with suitable internal spaces and in which are fitted valve seats 53 and 54 against which the valves 55 and 56 seat, respectively. The valves 55 and 56 are mounted upon valve rods 57 and 58, which are slidably mounted in castings 59 and 60 and bushings 61 and 62. The valve rods are provided with the usual packing arrangement to render the joints air or water tight. Springs 65 and 66 surround the reduced portions 63 and 64 of the valve rods 57 and 58, respectively. These springs at one end engage a shoulder on the valve rods, and at the other end engage members 67 and 68 which are rigidly connected to the valve casing. The springs are therefore under compression and act normally to hold the valves closed. An operating handle 69 is pivoted to the valve structure at 70 and is provided with an antifriction roller 71 which is adapted to engage the ends of the valve rods 57 and 58. When the handle is moved in one direction it opens the valve 55, and when moved in the other direction it opens the valve 56. The chamber 72 of the inlet valve 55 is connected to the chamber 73 of the exhaust valve 56 by a connection 74, as shown in dotted lines in Figure 9. The chambers 72 and 73 are also connected to the pipes 48 which enter the cylinders of the jacks.

Prior to placing the plate of glass 75 upon a table, as shown in Figures 2 and 6, the wooden platform 36 thereof is covered with a suitable plaster, such as plaster of Paris. The plate is then laid on the plaster in the usual manner. The plaster is represented by the heavy line 76 in Figures 2 and 6.

The operation of my apparatus will now be described. A plate of glass is taken from the rack 3 by the crane 2 and deposited at the desired point. A table 4 is then brought into position and covered over with plaster. The plate of glass is then placed upon the plaster in the ordinary way and the table with the glass thereon is placed on a truck 5, which is usually on the tracks 7, as shown in Figure 1. The truck is provided with antifriction rollers 77, and when the same has been run along the tracks 7 to the proper position, the table with the plate of glass thereon is moved into one of the grinding machines 8. The plate is then ground, and after it has been ground it is again run onto a truck 5. A truck 5 on the tracks 6 is then run into line with the truck on the tracks 7 and the table is moved across onto the truck on the tracks 6, and from there it is carried into any one of the polishing tables 9, whereupon the glass is polished. After the polishing operation, the table with the glass thereon is run onto a truck 5 on the tracks 6 and carried to the device 10 for the purpose of turning the plate so that it may be ground and polished on the other side.

The device for turning the plate has been previously provided with a table 4 similar to the one upon which the plate rests. This table is held in the clamping devices 26, one of which is carried by each of the pistons of the jacks, and is placed in those devices upside down, that is to say, with the wooden platform on the lower side, as shown in Figures 2 and 6. In order that this table may be high enough for the truck with the table and the glass thereon to pass under the same, either liquid or air has been forced into the jacks so as to raise the pistons together with the table which is held thereby. The glass is then provided on its polished side with plaster and is run under the table held by the jacks. This table is lowered into contact with the plaster, and the clamping devices 26 are then fastened around the projections 29 and 30 on the lower table and the set screws 31 are tightened so as to hold the two tables with the plate of glass between them securely together. The jacks are again raised in order to lift the lower table clear of the truck, which is then moved away from under the tables. The tables with the plate of glass between them are rotated around the trunnions 22 so that the side of the plate which has not been ground and polished is up and the polished side is down. The truck is then run back under the tables and the jacks are lowered by properly manipulating the handle 69 so that the lower table rests upon the truck. The clamping devices 26 are then released from the lower table, the jacks are again raised by operating the handle 69 to open the valve 55 and the upper table is lifted and removed from the plate of glass, which is then in position on the lower table. This table with the plate thereon is then removed to the grinders and polishers, and the other side is ground and polished. The upper table remains in the jacks. It may be rotated around the projections 29 and 30 as trunnions and the plaster removed. When the next plate is presented and turned as heretofore explained, the upper table becomes the bottom one upon which the plate rests. After the table has been cleaned, and during the time that it remains in the jacks, one of the pins 40 is placed through one of the openings in the arms 37 or 38 and enters the registering opening in a boss on the table and holds the table in a horizontal position.

My invention has many advantages, among which may be mentioned that the plate during the turning operation is supported throughout its area, no transverse strains are imposed upon the plate and breakage thereof is therefore avoided; by reason of the protection afforded the plate during the turning operation, the same may be more quickly handled, thus effecting a substantial saving in time and labor; and by reason of the means for holding a vacant table at the turning station, a minimum amount of labor is required to place the plate in the turning mechanism and release it therefrom. Many other advantages will be apparent to those skilled in the art.

While I have shown and described one embodiment of my invention in great detail, I desire it to be understood that I am not to be limited to the exact arrangement shown and described, as many changes may be made in the details of the apparatus without departing from the spirit of my invention.

I claim:

1. In a device for handling plates of glass or the like, the combination of a support for one side of said plate, a support for the other side of said plate, and means for securing said supports together with said plate between them, trunnions connected to said last mentioned means, journals for said trunnions, means for moving said journals up and down, and means movable with said journals for holding said trunnions against rotation, substantially as described.

2. In a device for handling plates of glass or the like, the combination of a table for supporting said plate, a second table for supporting said plate, means for placing said second table on said plate when said plate is on said first table, means for fastening said tables together with the plate therebetween comprising projections on opposite sides thereof substantially midway between the ends of said tables, trunnions for the tables, and means on the trunnions for holding said projections to fasten the tables together, and means for turning said tables and plate through 180°, substantially as described.

3. In a device for handling and treating plates of glass or the like, the combination of grinding machines and polishing machines, tracks in front of said machines, trucks on said tracks adapted to carry tables with said plates thereon, anti-friction devices between said tables and trucks whereby said tables may be readily moved onto and off of said trucks for transporting the plates to the grinding and polishing machines, a station along one set of said tracks, means at said station for moving said truck and table relatively to each other and to render said table with the plate thereon rotatable to a position from which it may be received by said truck after rotation has been effected, and means for supporting said plate during and after the turning operation, substantially as described.

4. In a device for turning plates of glass or the like, the combination of a table for supporting said plate, a second table for supporting said plate and adapted to be placed on the opposite side of said plate from said first table, means as stated in claim 2 for fastening said tables together, said means being rotatable, means for raising and lowering said tables with the plate between them and also for raising and lowering the uppermost table independently of the other table, substantially as described.

5. In a device for turning plates of glass or the like, the combination of a table for supporting the plate, a carriage for transporting the table and plate, means for placing a second table on said plate while the plate is on said first table, means as stated in claim 2 for fastening said tables together with the plate between them, and means whereby said tables and plate may be rotated so that said plate rests upon the second table, substantially as described.

In testimony whereof I have hereunto set my hand.

WILLIAM DUSTER.